US008062532B2

(12) United States Patent
Grott

(10) Patent No.: US 8,062,532 B2
(45) Date of Patent: *Nov. 22, 2011

(54) PROCESS FOR ELECTROLYTIC PRODUCTION OF CHLORINE PRODUCTS AND BYPRODUCTS

(76) Inventor: Gerald J. Grott, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/231,128

(22) Filed: Aug. 29, 2008

(65) Prior Publication Data

US 2009/0057240 A1 Mar. 5, 2009

Related U.S. Application Data

(63) Continuation-in-part of application No. 11/978,890, filed on Oct. 30, 2007, now Pat. No. 7,947,185, which is a continuation of application No. 10/706,341, filed on Nov. 11, 2003, now Pat. No. 7,353,634.

(51) Int. Cl.
*C02F 1/461* (2006.01)
(52) U.S. Cl. .............. 210/748.01; 205/536; 205/556; 205/516; 422/22; 422/26; 422/27; 210/748.16; 210/748.17; 210/748.2
(58) Field of Classification Search .............. 210/748, 210/600, 748.01, 652, 670, 687, 748.2; 204/157.46, 204/157.5, 242; 422/22, 24, 26, 27; 205/536, 205/556, 516, 618–625
See application file for complete search history.

(56) References Cited

U.S. PATENT DOCUMENTS

| 3,077,054 | A | | 2/1963 | Niemeijer |
| 3,224,867 | A | | 12/1965 | Milloch |
| 3,329,595 | A | * | 7/1967 | Barbato et al. ............. 205/527 |
| 3,627,479 | A | * | 12/1971 | Yee ............................ 423/164 |
| 5,125,770 | A | | 6/1992 | Hessling |
| 5,240,579 | A | * | 8/1993 | Kedem ...................... 205/749 |
| 5,300,123 | A | | 4/1994 | Grott |
| 7,353,634 | B2 | * | 4/2008 | Grott ........................ 47/58.1 R |
| 2002/0108909 | A1 | * | 8/2002 | Hughes ...................... 210/670 |
| 2002/0170816 | A1 | * | 11/2002 | Leffler et al. ........... 204/157.46 |
| 2008/0164218 | A1 | * | 7/2008 | Grott ........................... 210/748 |

FOREIGN PATENT DOCUMENTS

WO WO 98/06483 2/1998

OTHER PUBLICATIONS

Terrence J. McManus P.E., Re-use of Agricultural Wastewaters from Power Plant Cooling One-year Pilot Plant Experience (XP-001030054).
Robert C. Cooper, Public Health Concerns in Wastewater Re-use, Wat. Sci. Tech., vol. 24, No. 9, p. 55-65, 1991.
R.J. Bull, FC. Kopfler RJ. Toxicological Evaluation of Risks Associated with Portable Re-use of Wastewater, p. 2176-2194.
Mark Schonbeck, "Does My Soil Need Cation Nutriends Balancing?" A Practical Guide to Nutrition for Soil Crops, Downloaded from the web on Sep. 27, 2004.

(Continued)

*Primary Examiner* — Nam Nguyen
*Assistant Examiner* — Cameron J Allen
(74) *Attorney, Agent, or Firm* — Sinorica, LLC

(57) ABSTRACT

An integrated process separates salts from salty waters and electrolyzes the salts to produce chlorine products such as chlorine, hypochlorites, chlorates and/or caustic soda.

4 Claims, 1 Drawing Sheet

OTHER PUBLICATIONS

Marvin Fleischman, Re-use of Wastewater Effluent as Cooling Tower Make-up Water, p. 501-514.

Lisa Lieberman, Recycled Wastewater Used to Irrigate Crops in California, The Vegetable Growers News, 2003, Great American Publishing.

Minerva Canto, Wetlands to be Protected, The West, Printed Sep. 27, 2001, L.A. Times, Los Angeles, CA.

Ken Ellingwood, EPA to Rule on Imperial County's Dusty Air Quality, The State, L.A. Times, Nov. 1, 2001, Los Angeles, CA.

G.J. Grott, "Do-It-Yourself" Liquid Clorine Bleach for Rural Sanitation, Presented at the 3rd NFS International Symposium on Small Drinking Water and Wastewater Systems, Apr. 2001.

Edited by Rob M. Geertman, Changing Waste Irrigation Waters from Pollutant to Beneficial Products, 8th World Salt Symposium, vol. 1, 2000.

H. Clark Metcalfe, Modern Chemistry, 1986, p. 347-351, 2nd Addition, Holt McDougal.

Glossary of Terms Used in Physical Organic Chemistry (IUPAC Recommendations 1994), downloaded from web Jan. 22, 2003.

Environmental Help Line, Downloaded from web on Apr. 8, 2003.

Salinity, downloaded from web on Apr. 8, 2003.

Terry Plane, Salinity Threat to Drinking Water, Jan. 22, 2003, Downloaded from web on Apr. 8, 2003.

Bettina Boxall, Salton Sea Plan Proposed, L.A. Times News Paper, May 12, 2003. Los Angeles, CA.

B.D. Seeling (Soil Scientist), Salinity & Sodicity in North Dakota Soils, May 2003.

Thomas E. Huggler, Cannon's Guide to Freshwater Fishing with Downriggers, Nov. 1986.

J.R. Griffin, J.C. Silvertooth, E.R. Norton, Evaluation of Calcium Soil Conditioners in an Irrigated Cottong Production System, 1997, downloaded from web Mar. 31, 2000.

Edited by Robert A. Wright, The Reclamation of Disturbed Arid Lands, University of New Mexico, Alburquerque.

N.A. Wynhausen, Ion Exchange Regeneration for the Soft Water Service Industry, Reprinted from a series by Mr. Wynhausen, Published in "Water Condidtion and Purifcation Mag".

\* cited by examiner

US 8,062,532 B2

PROCESS FOR ELECTROLYTIC PRODUCTION OF CHLORINE PRODUCTS AND BYPRODUCTS

RELATED APPLICATIONS

This application is a continuation-in-part of application Ser. No. 11/978,890, filed Oct. 30, 2007 now U.S. Pat. No. 7,947,185, which was a continuation of application Ser. No. 10/706,341, filed Nov. 11, 2003, now U.S. Pat. No. 7,353,634, issued Apr. 8, 2008.

FIELD OF THE INVENTION

The present invention relates to an integrated process for preparing useful products from waste waters that were formerly discarded, e.g., salty irrigation drainage.

In a more particular respect, the integrated process yields a clean water stream which can be recycled for irrigation or other uses. The intermediate salt product is the raw material for an electrolytic process for preparing chlorine, hypochlorite and related products.

These and other, further and more specific objectives and advantages of the invention will be apparent to those skilled in the art from the following detailed description taken in conjunction with the drawings, in which:

BACKGROUND OF THE INVENTION

Figure 1:
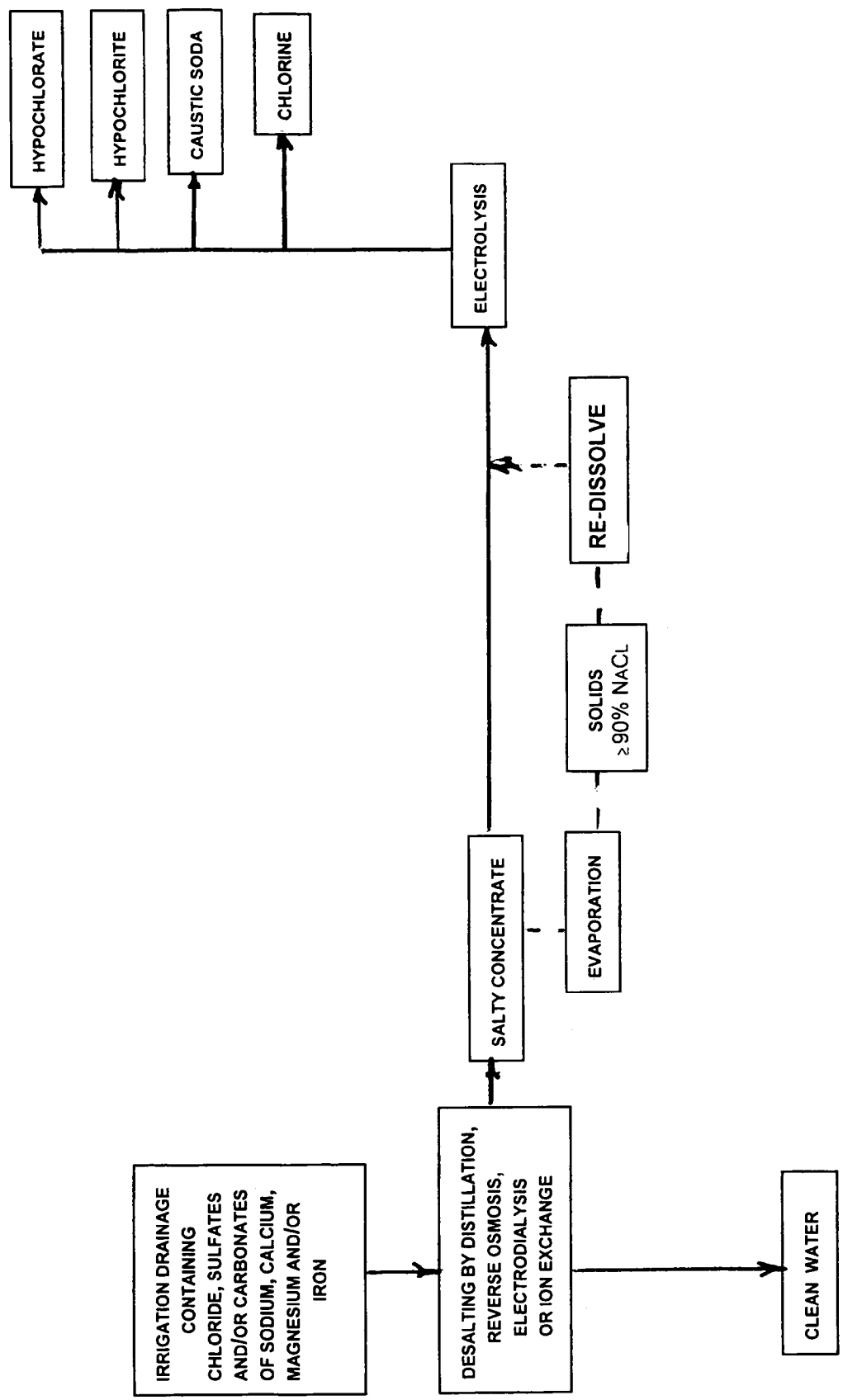
FIG. 1 is a flow chart depicting my integrated process which combines the initial purification of salty waters with the electrolytic production of a chlorine and/or byproducts.

Water purification typically produces a first effluent of relatively "clean water" and a second effluent of "waste water" which includes unwanted contaminants.

For example, the softening of hard water by the removal of calcium and magnesium is required for both industrial and household use. Known water softening processes proceed either by way of ion-exchange, membrane softening or precipitation. In the ion-exchange processes, the calcium and magnesium ions are exchanged for sodium ions. Regeneration of the ion-exchange resin is achieved with a large excess of sodium chloride. This process creates a regeneration effluent being a relatively concentrated aqueous solution of sodium, calcium and magnesium chlorides. Consequently, by this method, considerable amounts of sodium, calcium and magnesium salts in solution must be disposed of.

Alternatively, it is possible to use weak acid resins which exchange hydrogen for calcium and magnesium ions, and to regenerate the spent resins with a mineral acid. While this method creates less waste water, it is more expensive and yields relatively acidic soft water which is corrosive.

Membrane softening concentrates the calcium, magnesium salts and salts of other divalent ions to produce waste waters which require costly disposal.

The precipitation process has traditionally been carried out by the "lime soda" process in which lime is added to hard water to convert water soluble calcium bicarbonate into water insoluble calcium carbonate. This results in waste water which is difficult to filter and requires use of cumbersome equipment.

It would be desirable if salty waters, e.g., salty irrigation drainage, could be processed to provide a recycle stream of clean water and a waste stream containing salts that can be processed by electrolysis for producing chlorine products and byproducts.

BRIEF DESCRIPTION OF THE INVENTION

Briefly, in accordance with the invention, I provide an integrated process for manufacturing chlorine products comprising, in combination, the steps of treating salty waters to produce a clean water stream and a waste water stream, and electrolyzing salts contained in said waste stream to provide chlorine products such as chlorine, hypochlorites and chlorates and electrolysis byproducts such as sodium hydroxide.

The salty waters can be varied in source such as irrigation runoff, salty groundwaters, oil field production waters and the like.

As defined herein, clean water refers to water which has been treated by one or several methods for public or industrial use. For example, in the drinking water industry, clean water is the final delivered water. Typical water purification processes and water softening processes create waste water having various levels of salt content. For the purposes of this invention, I define "waste water" as water containing about 0.15% or more by weight of the chloride sulfate or carbonate salts of sodium, potassium, magnesium or iron and combinations thereof.

DETAILED DESCRIPTION OF THE PREFERRED EMBODIMENTS

Several methods for effecting water softening are known. The best known process for softening water is "ion-exchange." Ion-exchange entails the exchange of sodium, which is introduced into water, for calcium, magnesium, iron and other divalent mineral ions which are transferred out of the water and into a resin. When the resin approaches saturation with these "hard" ions, the resin is regenerated, most often with solutions of sodium chloride, leaving an effluent containing 3 to 25% sodium, calcium and magnesium salts which must be disposed of.

The exact concentration of the effluent depends on the shop practice and, in particular, on the amount of rinse water included in the effluent, if any. Less often mineral acids like sulfuric acid or hydrochloric acid are used for water softening and these also produce effluents. Conversely, reverse water softening also involves ion exchange in which calcium and magnesium are introduced into the water to separate sodium.

Membrane systems have recently become economically feasible. These systems, such as electro-dialysis and reverse osmosis, include the use of a membrane which also produces a salty effluent.

Each of these water purifying processes produces a clean water effluent and a waste water effluent which is expensive and difficult to dispose of, contaminated with salts including the chloride, sulfate and carbonate salts of sodium, potassium, calcium, magnesium and iron. The purification processes may be any of those known by those skilled in the art, including distillation, reverse osmosis, electrolysis, evaporation, ion exchange, etc. The contaminated water is processed to produce a first effluent of relatively clean water which is useful for agricultural purposes, drinking water, industrial purposes, etc. The processing also produces a second effluent of waste water comprising an aqueous solution of the salts.

EXAMPLE 1

Samples of salty irrigation runoff water contain contaminants, including

|  | Mean mg/l |
| --- | --- |
| Calcium | 515 |
| Magnesium | 289 |
| Sodium | 4480 |
| Sulfate | 6700 |
| Chloride | 3290 |
| Total Dissolved Solids | 14,100 |

This irrigation runoff is treated by ion-exchange purification to separate sodium and produce a clean water effluent that is recycled for use as agricultural irrigation without increasing soil salinity. The recycled stream contains

|  | Mean mg/l |
| --- | --- |
| Calcium | >50 |
| Magnesium | >30 |
| Sodium | <300 |
| Sulfate | <450 |
| Chloride | <200 |
| Total Dissolved Solids | <1200 |

The waste stream from the purification step is either directly introduced into the electrolysis step or evaporated in solar ponds to produce a solid salt product that is trucked to the electrolysis plant.

EXAMPLE 2

A sample of the salt recovered from waters from the Salton Sea is treated by ion exchange, followed by solar evaporation. The solid salt product is used to make an aqueous solution containing about 1% sodium chloride. This solution is subjected to electrolysis to make sodium hypochlorite bleach.

Having described my invention in such terms as to enable one skilled in the art to understand and practice it and, having identified the presently preferred embodiments thereof, I claim:

1. An integrated process for manufacturing chlorine products comprising in combination the steps of
   (a) treating salty waters to produce a clean water stream and a waste water stream containing increased salt content;
   (b) electrolyzing salts contained in said waste stream to provide a chlorine products such as chlorine, hypochlorites or chlorates and/or electrolysis byproducts such as sodium hydroxide;
   said waste water stream comprises a salty effluent of reverse osmosis softening said salty waters to produce a clean water stream;
   said waste water stream comprises irrigation runoff water; and
   said waste water stream is evaporated to a solid, transported and re-dissolved before said step of electrolyzing.

2. The process set forth in claim 1, wherein said waste water stream comprises a regeneration effluent of ion-exchange softening said salty waters to produce a clean water stream.

3. The process set forth in claim 1, wherein said waste water stream contains from 3% to 25% salts of sodium, calcium and magnesium.

4. The process set forth in claim 1, wherein said waste water stream comprises a salty effluent of electro-dialysis softening said salty waters to produce a clean water stream.

* * * * *